Feb. 1, 1949.  A. ZELVIN  2,460,563
RELATIVELY MOVABLE MEMBERED PUZZLE
Filed May 8, 1946  2 Sheets-Sheet 1

| A | | | | |
|---|---|---|---|---|
| 1 | 3 | 5 | 7 | 9 |
| 11 | 13 | 15 | 17 | 19 |
| 21 | 23 | 25 | 27 | 29 |

| B | | | | |
|---|---|---|---|---|
| 2 | 3 | 6 | 7 | 10 |
| 11 | 14 | 15 | 18 | 19 |
| 22 | 23 | 26 | 27 | 30 |

| C | | | | |
|---|---|---|---|---|
| 4 | 5 | 6 | 7 | 12 |
| 13 | 14 | 15 | 20 | 21 |
| 22 | 23 | 28 | 29 | 30 |

| D | | | | |
|---|---|---|---|---|
| 8 | 9 | 10 | 11 | 12 |
| 13 | 14 | 15 | (24) | 25 |
| 26 | 27 | 28 | 29 | 30 |

| E | | | | |
|---|---|---|---|---|
| 16 | 17 | 18 | 19 | 20 |
| 21 | 22 | 23 | (24) | 25 |
| 26 | 27 | 28 | 29 | 30 |

INVENTOR.
ARNOLD ZELVIN
BY
ATTORNEY

Feb. 1, 1949.  A. ZELVIN  2,460,563
RELATIVELY MOVABLE MEMBERED PUZZLE
Filed May 8, 1946  2 Sheets-Sheet 2
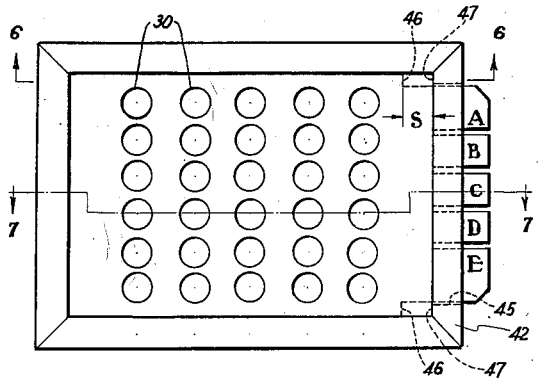
Fig. 3.
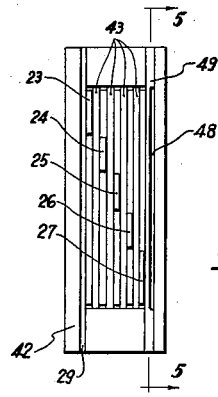
Fig. 4.
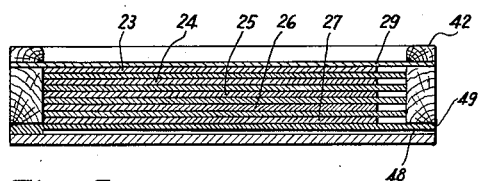
Fig. 6.
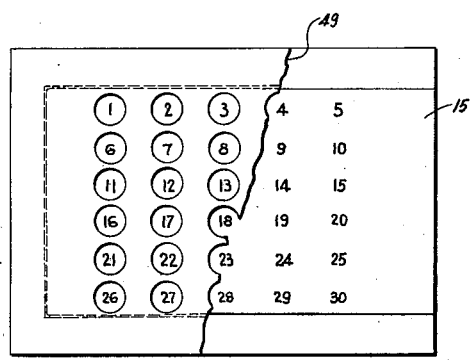
Fig. 5.
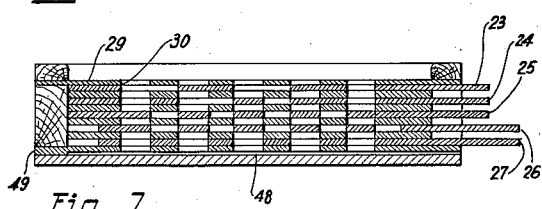
Fig. 7.
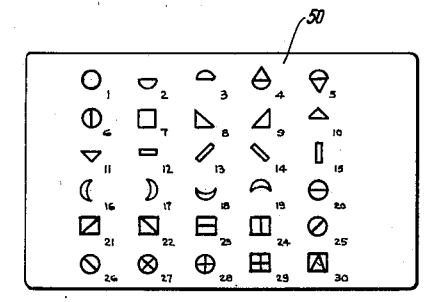
Fig. 8.
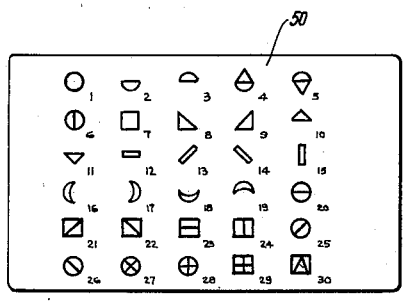
Fig. 9.
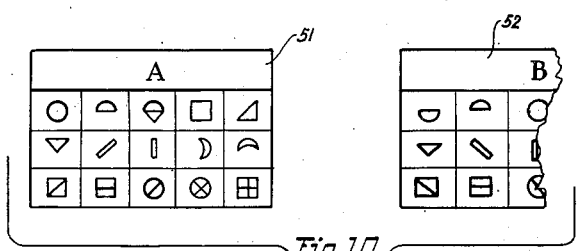
Fig. 10.
INVENTOR.
ARNOLD ZELVIN
BY
ATTORNEY Patented Feb. 1, 1949

2,460,563

UNITED STATES PATENT OFFICE 2,460,563

RELATIVELY MOVABLE MEMBERED PUZZLE

Arnold Zelvin, New York, N. Y.

Application May 8, 1946, Serial No. 668,067

4 Claims. (Cl. 273—155)

This invention relates to game devices, more particularly to those in the category of guessing or selector games.

There are certain known games where a performer is enabled to guess a number mentally chosen by a participant or selector. These games have proven to be of great appeal both to adults and children, primarily because of the mystery involved in a performance which is seemingly akin to "mind-reading." Most of these games, however, require a certain degree of mental or manual dexterity on the part of the performer, or involve the skillful manipulation of a number of separate elements. Such games are accordingly limited to the use of performers who have the requisite qualifications, thereby eliminating large numbers of children as performers.

It is primarily within the contemplation of my invention to provide a selector game of the above-mentioned category that can be simply and easily actuated by a performer, including children not having the requisite qualifications to act as performers in the conventional games of this class. And in this aspect of my invention it is an important object to provide a mechanical device which could be operated by extremely simple manual operations.

It is also an object of this invention to enable a selected number, object or name to be visibly displayed on the device by one or more simple manipulations of the performer.

And it is further within the contemplation of my invention to enable the device to be readily adapted for educational purposes.

Another object of this invention is to provide a simple, easily constructed and inexpensive device capable of effectively performing the objects above mentioned.

Other objects, features and advantages will appear from the drawings and the description hereinafter given.

Referring to the drawings,

Figure 3 is a plan view of a preferred structure of my invention, the slides being shown in their retracted positions;

Figure 4 is an end view of Figure 3;

Figure 5 is a section of Figure 4 taken substantially along line 5—5, a fragment of the apertured base plate being removed to show the underlying base card;

Figure 6 is a section of Figure 3 taken along line 6—6;

Figure 7 is a section of Figure 3 taken substantially along line 7—7 thereof, showing two of the slides in their projected positions;

Figure 8 is a perspective view of the said structure of my invention, fragments being removed to show an intermediate apertured plate and the underlying slide in its projected position, and also showing a removable base card partly inserted;

Figure 9 represents a modified form of base card wherein geometric symbols are employed instead of merely numerals, and Figure 10 represents selector tables based upon the card of Figure 9, this view showing merely one of such tables and a fragment of another.

Figures 1, 2:
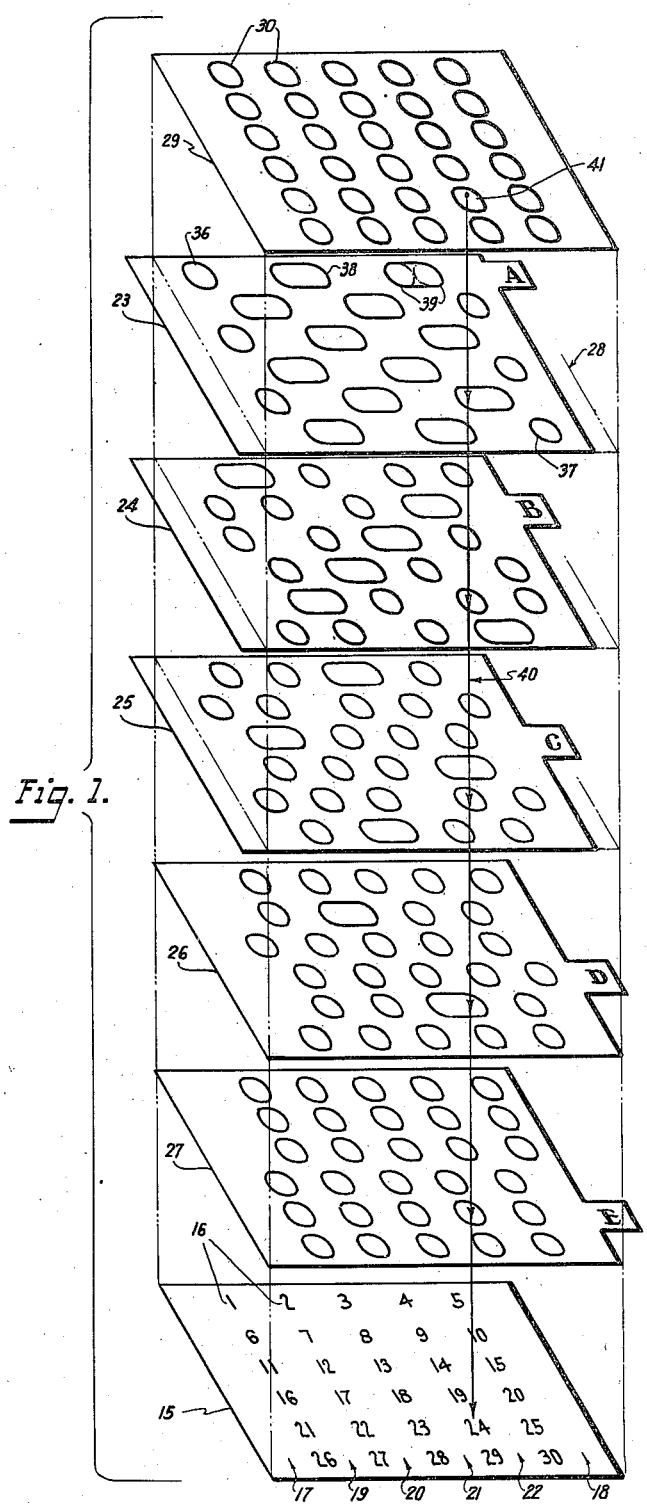
Figure 1 is a semi-diagrammatic perspective of the basic elements of a preferred form of my invention, showing the relationship of such elements.
Figure 2 represents a series of selector tables containing keyed lists arranged to correspond with the slide members and the base card of Figure 1, according to my invention.

In the embodiment of my invention according to Figure 1, a base card 15 is employed containing on the upper face thereof a series of numbers from 1 to 30 arranged in five vertical columns, the sequence of numbers running in horizontal rows from left to right. These columns, generally designated as 16, are equally spaced, the end vertical spaces 17 and 18 being preferably more than half the width of the intermediate spaces 19, 20, 21 and 22. In superposed relation above the base card 15 are the slide sheets 23, 24, 25, 26 and 27, each of these sheets being independently movable between an inoperative or retracted position, and an operative or projected position. For purposes of illustration sheets 23, 24, and 25 are shown in their retracted positions, the dot-dash lines such as 28 illustrating the projected positions of the sheets; and sheets 26 and 27 are shown in their projected positions. The extent of operative movements of each sheet is limited precisely to one-half the distance between columns 16, that is one-half of the spaces therebetween, such as spaces 19, 20, etc.

Each of the slide sheets contains a differently arranged pattern of apertures, certain of the apertures being in registry with certain of the symbols on the base card 15 when the sheet is in its retracted position, the remaining apertures being in registry with the other symbols on the base card when the sheet is in its projected position, all as will more clearly hereinafter appear. It is preferred, for best operative results, that there be an apertured cover plate 29, the apertures 30 therein corresponding in number and position with each of the symbols on the base card 15, the arrangement hence being such that if there were no slide sheets between cover plate 29 and base card 15, all the symbols on the base card would be visible through apertures 30.

The structure above described is adapted for use with a series of selector tables containing thereon lists keyed to or based upon the arrangement of symbols on base card 15. In the particular embodiment of my invention illustrated in Figure 1, the symbols consist, as aforesaid, of a series of numbers arranged in numerical sequence. With such a base card, I employ a series of tables 31, 32, 33, 34 and 35 each containing thereon numerals involving geometric progressions. It will be observed that the first numerals on the tables are part of a geometric progression beginning with 1, and continuing along the series 2, 4, 8 and 16, the total number of tables depending upon the total number of symbols on base card 15. Each successive table contains a series of numbers in which the particular factor of the above-mentioned geometric series, with which the series of numbers on each table begins, is a factor of each number on that table. For example, in table 31, the numeral 5 contains the factors 1 and 4, and the numeral 29 contains the factors 1, 4, 8, 16; in table 32, the numeral 6 contains the factors 2 and 4, and the numeral 30 contains the factors 2, 4, 8, 16; in table 33, the numeral 12 contains the factors 4 and 8, and the numeral 30 contains the factors 4, 2, 8, 16; in table 34, the numeral 9 contains the factors 8 and 1, and the numeral 30 contains the factors 8, 2, 4, 16; and in table 35, the numeral 17 contains the factors 16 and 1, and the numeral 30 contains the factors 16, 2, 4, 8.

According to the structure illustrated, slide sheet 23 corresponds with the list on table 31, and similarly the other slide sheets 24, 25, 26 and 27 correspond, respectively, with the lists on tables 32, 33, 34 and 35. More specifically, the apertures on each of the cards are so arranged that, when pulled out into their projected position, they will be in registry only with those numbers on the base card which are to be found on the corresponding table; and when pushed back into their retracted positions, they will be in registry with the other numbers on the base card. For example, referring to slide sheet 23 in its illustrated retracted position, hole 36 will be to the left of number 1 on the base card, but hole 37 will be in registry with the number 30. And it will be observed that table 31 contains the number 1, but does not contain the number 30. Now, when the said sheet 23 is moved into its projected position, the hole 36 will be in registry with the number 1 on the base card, whereas the hole 37 will be out of registry with the number 30 on the base card. The same system is followed with respect to each of the slide sheets and their corresponding selector tables.

It will be observed that certain of the holes on the slide sheets, such as holes 38, are elongated. This is merely a matter of fabrication expediency inasmuch as two adjacent holes on a horizontal line would leave insufficient material therebetween for structural strength. This is illustrated in elongated hole 39, which shows two dot-dash adjacent holes for which the elongated hole has been substituted.

In the preferred method of playing this game, the performer asks a participant or selector to mentally choose a number from 1 to 30 (or from a greater or lesser series of numbers, depending upon the base card 15). Thereafter, the selector is shown each of the tables 31, 32, 33, 34 and 35, and asked to designate on which of the tables his chosen number appears. The performer pulls out the slide sheets corresponding to the tables on which the number appears, and the chosen number will be seen on the base card upon looking through the holes 30 in the cover plate. If, for example, the number 24 were chosen, it will be seen that such number appears only on tables 34 and 35. When the corresponding slide sheets 26 and 27 are thus pulled out to their projected positions, there will be an unobstructed line of sight, along line 40, from hole 41 on cover plate 29 right down to the number 24 appearing on base card 15, as Figure 1 clearly shows.

If it is desired to change the arrangement of numbers appearing on the base card 15 and on the tables, all that need be done is to devise a code, whereby certain selected numbers may be substituted for those shown on the base card; and the numbers on the selector tables will be keyed to the coded base card. Or if it is desired to employ symbols instead of numerals, a master card properly keyed to the base card 15 could be similarly used—said master card containing symbols such as are shown on Figure 9—or, if desired, names of persons, places or other data or symbols which may have special educational or entertainment value.

The particular preferred structure in which the basic elements above-mentioned are employed is illustrated in Figures 3 to 8, inclusive. A frame 42 constitutes the periphery of the device, such frame containing a plurality of spaced parallel intermediate stationary plates 43, each of these plates containing apertures 44 corresponding in number and position to the symbols appearing on the base card 15. The cover plate 29 is at the top of the structure, the holes 30 thereof being arranged in the manner indicated in Figure 1. Between the intermediate plates 43 are positioned the slide sheets 23, 24, 25, 26 and 27, these being provided with tabs A, B, C, D and E, respectively. These tabs extend outwardly through end openings 45 in the frame, so as to permit them to be manually grasped. Each of the slides, in the preferred construction illustrated, contains shoulders 46 adapted for abutment against the inner walls 47 of the end of frame 42. The distance S (Figure 3) represents the extent of the operative movement of each of the slide sheets, this distance being equal to one-half the distance between vertical columns 16, as aforesaid.

The arrangement is hence such that each of the slides can readily be moved to retracted or projected positions by a simple manual manipulation, the extent of movement being predetermined to make the device operative. The intermediate plates 43 serve as separators between the slides and enable them to independently move, whereby the operative movement of one will not affect the others.

In the preferred construction of my invention, the base of the device contains a compartment 48 adapted to slidably receive the base card 15. Where such a construction is employed, an apertured base plate 49 is employed directly thereover, the apertures corresponding in number and position to the symbols on the base card 15.

As above indicated, an arrangement of symbols may be employed in place of the numerals, as indicated in Figures 9 and 10. A master card 50 contains the symbols which correspond to the numerals on base card 15. Hence when the device is employed to guess a mentally chosen symbol by reference to table cards 51 and 52 (Figure 10), and a number is thereafter disclosed upon the movement of the appropriate slides, that number can be correlated to the symbols appearing on master card 50. Or, if desired, the said master card 50 can serve as a base card, and may directly be inserted within compartment 48, so that the chosen symbol will directly be visible on the device.

This device has many adaptations, depending upon the particular base cards used, or upon the particular method of coding the base card to predetermined symbols, names, or even answers to quizzers. Regardless of the various adaptations, it is apparent that the device requires the simplest kind of manual manipulation to operate, and entails practically no more judgment than could be exercised by the average child.

In the accompanying drawings, the invention has been shown merely by way of example and in the preferred form, but obviously many variations and modifications may be made therein which will still be comprised within its spirit. It is to be understood, therefore, that the invention is not limited to any specific form or embodiment, except in so far as such limitations are specified in the appended claims.

I claim:

1. In a game device of the class described, a frame member, a base card disposed within and supported by the frame and containing on the upper face thereof a plurality of symbols, a plurality of parallel, stationary plates above said base card and supported by the frame in spaced relation, one above the other, each containing apertures corresponding in number and position and in registry with all the said symbols on the base card, a plurality of slide sheets slidably supported within the frame and in superposed relation, there being one sheet between two adjacent plates, each of said sheets being independently movable between a predetermined retracted and a predetermined projected position, said sheets containing differently arranged apertured portions therein according to predetermined patterns, certain of the apertured portions of each sheet being in registry with certain predetermined symbols on the base card when the sheet is in its retracted position, the remaining apertured portions in the sheet being in registry with the other symbols on the base card when the sheet is in its projected position.

2. In a game device of the class described, a frame member, a base card disposed within and supported by the frame and containing on the upper face thereof a plurality of symbols, a cover plate and a plurality of parallel, stationary plates above said base card and disposed in spaced relation, one above the other, each of said plates being secured to the frame member and each containing apertures corresponding in number and position and in registry with all the said symbols on the base card, a plurality of slide sheets slidably supported within the frame and in superposed relation, there being one sheet between two adjacent plates, each of said sheets being independently movable between a predetermined retracted and a predetermined projected position, and tab members attached to each sheet and extending outwardly beyond the frame member, said sheets containing differently arranged apertured portions therein according to predetermined patterns, certain of the apertured portions of each sheet being in registry with certain predetermined symbols on the base card when the sheet is in its retracted position, the remaining apertured portions in the sheet being in registry with the other symbols on the base card when the sheet is in its projected position.

3. In a game device of the class described, a frame member, a base card disposed within and supported by the frame and containing on the upper face thereof a plurality of symbols arranged in a plurality of equally spaced vertical columns, a plurality of parallel, stationary plates above said base card and supported by the frame in spaced relation, one above the other, each containing apertures corresponding in number and position and in registry with all the said symbols on the base card, a plurality of slide sheets slidably supported within the frame and in superposed relation, there being one sheet between two adjacent plates, each of said sheets being independently movable between a predetermined retracted and a predetermined projected position, the distance between the said retracted and projected positions being one-half the distance between said colums of symbols, said sheets containing shoulders facing one inner end wall of the frame and engageable therewith for limiting the outward movement of the sheets to their projected positions, said sheets containing differently arranged apertured portions therein according to predetermined patterns, certain of the apertured portions of each sheet being in registry with certain predetermined symbols on the base card when the sheet is in its retracted position, the remaining apertured portions in the sheet being in registry with the other symbols on the base card when the sheet is in its projected position.

4. In a game device of the class described, a frame member, a base card disposed within and slidably supported by the bottom of the frame member and containing on the upper face thereof a plurality of symbols arranged in a plurality of equally spaced vertical columns, a plurality of parallel, stationary plates above said base card and supported by the frame in spaced relation, one above the other, each containing apertures corresponding in number and position and in registry with all the said symbols on the base card, a plurality of slide sheets slidably supported within the frame and in superposed relation, there being one sheet between two adjacent plates, each of said sheets being independently movable between a predetermined retracted and a predetermined projected position, the distance between the said retracted and projected positions being one-half the distance between said columns of symbols, said sheets containing differently arranged apertured portions therein according to predetermined patterns, certain of the apertured portions of each sheet being in registry with certain predetermined symbols on the base card when the sheet is in its retracted position, the remaining apertured portions in the sheet being in registry with the other symbols on the base card when the sheet is in its projected position.

ARNOLD ZELVIN.

REFERENCES CITED

The following references are of record in the file of this patent:

UNITED STATES PATENTS

| Number | Name | Date |
|---|---|---|
| 609,915 | Sibley | Aug. 30, 1898 |
| 840,144 | Lincoln | Jan. 1, 1907 |
| 863,845 | Hardy | Aug. 20, 1907 |